Feb. 1, 1938.  C. B. HUNTMAN  2,107,183
STABILIZING MEANS FOR MOTOR VEHICLES
Filed May 1, 1934
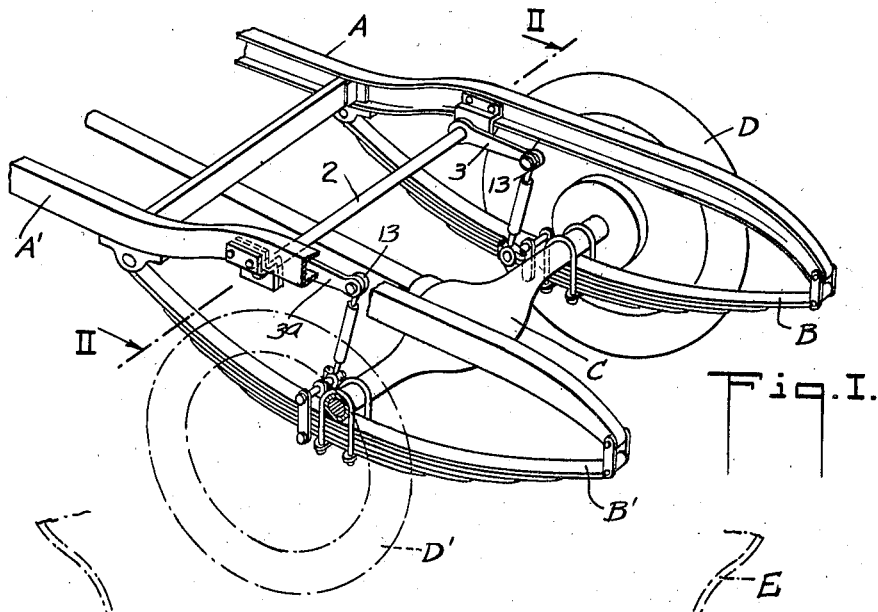
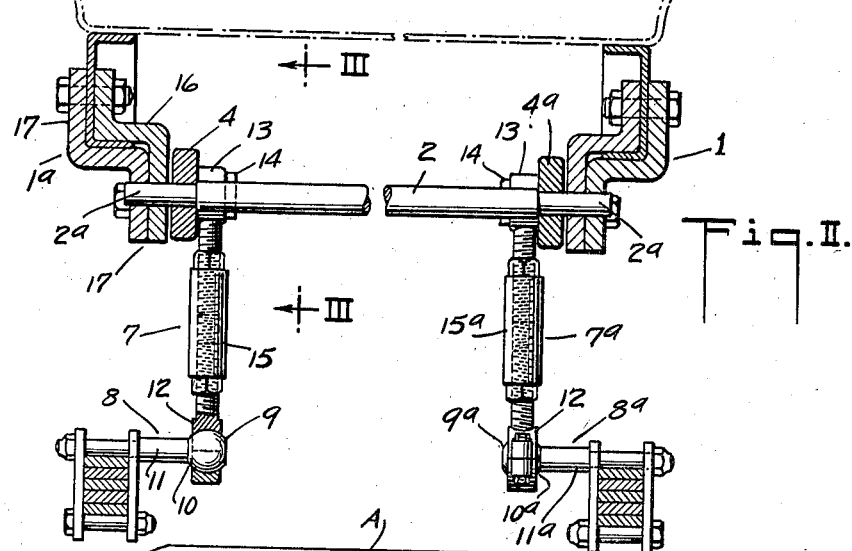
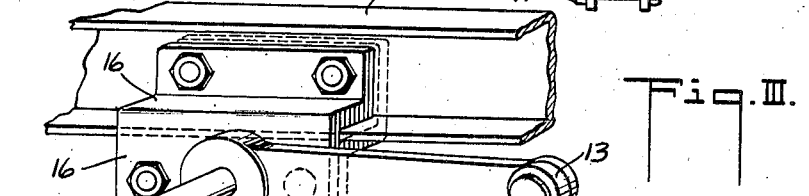
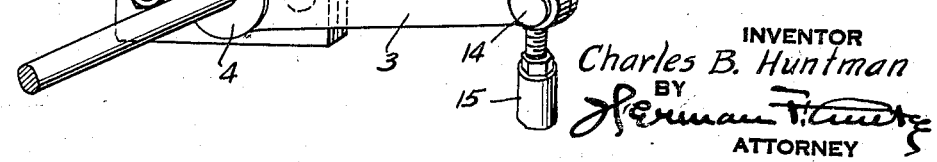
INVENTOR
Charles B. Huntman
BY
ATTORNEY Patented Feb. 1, 1938

2,107,183

UNITED STATES PATENT OFFICE 2,107,183

STABILIZING MEANS FOR MOTOR VEHICLES

Charles B. Huntman, Plainfield, N. J.

Application May 1, 1934, Serial No. 723,302

20 Claims. (Cl. 267—11)

This invention relates to the equalizing or balancing of shocks such as are involved in motor cars when wheels on one side are displaced by the uneven contour of the road, or when the centrifugal strain tends to careen the body when a car at speed is deflecting its course. My invention deals with the method of absorbing such shocks or strains, balancing the effect of the strains on both sides of the car, and various other advantages which will appear from a more detailed description hereinafter set forth, and, furthermore, involves apparatus to accomplish these results.

One of the main features of my invention involves the transmission of the shock and consequent relative movement of the wheel with respect to the frame on one side of the car, to a device on the opposite side of the car where the relative position of regular suspension comprises a spring or springs supporting the frame and load on each wheel support, absorb or resist the action on the opposite side, and, furthermore, to interconnect both sides of the car as to the suspension of axles or wheels in such a manner that the displacement on either side by uneven road surface will encounter reaction by the regular axle suspension on the opposite side, furthermore accomplishing a similar result when the relative displacement is due to the tendency of the body or the superload on a chassis to cause uneven deflection of springs on opposite sides due to the centrifugal force when speeding around curves or the like. Many variations in the apparatus may be made to practice lateral stabilizing of vehicles, and may in various ways be combined with shock-absorbing and to clearly set forth my invention it will now be described in one particular form of embodiment in a usual type of motor car.

This application is a continuation-in-part of my co-pending application Serial No. 51,908 filed August 24, 1925, which application has since matured as Patent No. 1,971,957 granted August 24, 1934.

The device for this present application is illustrated in the accompanying drawing as one example of the various modified forms of structure designed to accomplish certain functions also performed by part of my said former application. It aims to accomplish these purposes in a manner to satisfy conditions found in certain types of associated apparatus. The one, of various forms of my apparatus herewith shown and described is designed to effect by mechanical means, cross-car stabilizing as between sprung and unsprung masses of the car with structural parts in all respects suitable to meet the stresses and strains, and particularly such as are involved by the incessant continuous movement relatively when, as in motor cars, the sprung mass at velocity imposes great stresses on the parts and all connections of the sprung mass with the unsprung mass. The conditions of use in motor cars involved the requirement of effective functioning at great and all degrees of speed, over rough roads and abrupt or gradual curves or turns. With the incessant functioning uniformity of action must be maintained, and therefore it is essential that the structure will have minimum wear in long usage and avoid the slightest chance of breakage of parts or connections. With the velocity of the masses, their relative movement involves great stresses through the interconnecting parts, which I have combined, as herein shown and described, to avoid strains that would fracture parts, and interconnecting joints that will avoid cramping of connections, and thereby avoid wear with the constant oscillation, or due to slewing on curves, which otherwise would quickly demolish or wear parts of my structure to a useless condition, and ruin the effectiveness or proper functioning of my stabilizer.

A particular example of my construction is shown in the accompanying drawing, in which:

Fig. I is a perspective of the rear end of a chassis showing the embodiment of my invention in conjunction with the essential parts of a car.

Fig. II is a section on the line II—II of Fig. I, also indicating fragmentary a car body in dot-and-dash lines.

Fig. III is a fragmentary perspective view at a section III—III of Fig. II.

The automobile chassis comprises the sills A, A' and springs B, B' and a rear axle housing C, at the ends of which wheels D, D' are supported. In Fig. II a conventional body E is shown in dot-and-dash lines, which with the frame and associated parts make up the sprung mass.

On the sills A, A' bearings 1 and 1ª are attached providing for the support of a transverse bar 2 adapted to turn in the bearing blocks, and at either end adjacent each bearing torque-arms 3, 3ª are rigidly attached to move as a unit with bar 2 by their respective hubs 4, 4ª, which, as shown, are shrunk onto the ends 2ª, 2ª of bar 2 to provide a rigid fit, but may be otherwise secured as by a squared or hexagonal or splined joint. The opposite end of each arm is connected by a link to the axle or axle housing, or as shown it is fastened to a member attached to the vehicle springs close to the place of attachment of the springs to the axle housing constituting the wheel support.

The links 7, 7ª are secured to the attaching clips or lower connections 8, 8ª, by ball joints 9, 9ª, one of which is shown in section in Fig. II, consisting of a part spherical end 10, 10ª on the end of the stub 11, 11ª, to which the link end is attached by a socket 12, half of which is a cap bolted on for convenience of assembly. Each of these ball joints 9, 9ª provide for oscillation on an axis transverse to the axis of the axle, as well as in other directions, thus avoiding cramping of the joints and minimizing wear, for the practical utilization of my structure. The opposite end of each link is secured to the movable end of one of the levers 3, 3ª by a stud or pin 14 passing through an eye in the link end 13. Intermediate the ends of each link a sleeve 15, 15ª engages the threaded portions of the link ends, by right and left hand threads, so that the cooperation permits adjustment by the sleeve 15, 15ª to vary the length of each link, with lock-nuts at either end of each sleeve to hold them in the desired adjusted position.

The bearing for the bar 2 on each sill comprises the clamp plate 16 and an outer clamp plate 17 nesting on the channel forming the sill, both plates having the lower extensions forming a solid section with a sufficient thickness to provide a bearing for the ends 2ª of the bar 2. These built-up bearings are suitably bolted to the sills and may have their lower extensions bolted together, as shown.

While many variations may be made from the particular parts and connections as specifically shown, it will now be understood that the apparatus comprises a connection from the wheel support, or the spring adjacent to the wheel support, on each side of an automobile, and from such attaching means a link on each side, each operatively connected with the movable end of the lever substantially in the plane of each side sill, while the hub ends of the two levers are rigidly attached each to opposite ends of the transverse bar suitably supported in bearings secured to one of the masses on opposite sides of the car.

Thus any compression of a spring on one side of the car moves the link on that side and oscillates the lever-arm of the transverse or torque-bar, thereby transmitting to the opposite side the torque due to the deflecting force or compressing force on the spring. As the other end of the torque-bar is connected by its arm and link to the other mass of the car, or, as shown, to the spring close to the axle housing, the torque applied to the transverse bar is transmitted as compressing force on the spring at the opposite side. Likewise, any downward movement of a wheel on one side, as when going into a rut, pulls the lever on its side and transmits torque to the opposite side which is resisted by the spring on the other side, and therefore prevents the one wheel entering a rut from dropping down, as would otherwise be the case if it had no cross-connections with the wheel support on the opposite side.

In the case of driving around a curve the centrifugal force of the mass supported on the sills tends to compress the spring on that side of the car which is on the outside of the curve of the course of the car, but by the equalizing or balancing connections as above described, any compression of the spring on the outside is transmitted by the links, levers and torque-bar, so that the spring on the opposite side of the car, namely the inside of the curve, is also compressed, thereby both springs being forced to move in balanced relation to the sills, and thereby prevent the body from careening, that is the functioning of the structure stabilizes the body of the vehicle against side roll or rocking.

In other words, the effect of the device above described is to maintain the car body stabilized parallel with the road surface at all times independent of such forces as tend to cause unequal vertical accelerations between wheels on opposite sides.

The practical effect of my invention is the stabilizing of a motor car in motion, keeping it substantially on an even keel, and particularly when the car is driven at speed around curves which otherwise would tend to careen the body, while also maintaining the car substantially on an even keel when the wheels on one side go over obstacles or into ruts, and to minimize the rocking or rolling of the body. In general, it operates to prevent sidesway and as a stabilizer when rounding curves or on rough roads, which are the great advantages for ride-ease, that is when the car is in motion and particularly traveling at substantial speeds or making abrupt turns, but in addition my structure serves a double purpose, namely, when the car is unequally loaded on one side it acts as an equalizer or counter-balancing means for the car when either stationary or in motion.

While many variations may be made from the particular form of embodiment of my invention specifically illustrated in the accompanying drawing and specifically described, what I claim and desire to secure by Letters Patent is:

1. In a motor car having a sprung mass and an unsprung mass, stabilizing means interconnecting said two masses, comprising a bar-member journaled at one of said masses having an arm at each end extending laterally thereof, a link attached to the end of each arm and to the other mass, the joint at one end of each link adapted for articulation in a plurality of axes.

2. In a motor car having a sprung mass and an unsprung mass, stabilizing means interconnecting said two masses, comprising a rigid torsion-member journaled at one of said masses having an arm at each end extending laterally thereof, a link attached normally at substantially right angles to the end of each arm and to the other mass, the joint at one end of each link adapted for free oscillation on an axis transverse to the axis of the torsion-member.

3. A stabilizing equipment for use in preventing sidesway of the super-mass in motor cars, comprising a torsion-bar, arms extending laterally at substantially right angles to said bar, a link at the end of each arm pivoted thereto, a universal joint at the other end of each link connecting it to attaching means, the whole comprising a complete stabilizing equipment readily attachable and detachable to and from a motor car.

4. A vehicle chassis construction having in combination a frame, an axle extending transverse of the frame, suspension springs on opposite sides of the vehicle intermediate the frame and axle, a stabilizing bar with arms at each end extending generally at right angles to the bar, means of support for said bar permitting oscillation of the bar with the arms at the ends thereof, a link, a jointed connection at one end therefor to the outer end of each arm whereby the outer end of the arm maintains a substantially fixed distance from a connection of the link to a part of the vehicle while permitting relative movement between the frame and the axle with the oscillation of the bar, and having the connection of the link at one end a universal joint.

5. A vehicle chassis having in combination a sprung mass, an unsprung mass, suspension springs intermediate the masses, levers adjacent opposite sides of the chassis rigidly combined with a torsion-bar positioned transverse of the chassis, pivotal supports for said arms on one of said masses, the free end of each of said levers connected to the other mass by a link, each link having at one end a pivotal connection and at its other end a joint permitting oscillation laterally of the chassis, so constructed and arranged whereby the entire relative vertical movement of the two masses is transmitted free from cramping in substantially like amplitude from one side of the chassis to the other side throughout the range of flexing of the suspension springs at all speeds of travel of the chassis.

6. In a motor car having a sprung mass and an unsprung mass intermediate load-supporting springs, stabilizing means interconnecting said masses comprising a link on each side of the car, a universal joint at one end of each link connecting it at one of said masses, a joint at the other end of each link connecting it to the vertically oscillatable end of an arm, the arm on each side of said motor car having a support at the other mass permitting oscillation, and a cross-car torsion-bar rigidly associated with both arms whereby the arms oscillate together and cooperate with the torsion-bar to transmit the relative displacement of the masses equally on one side to the other side of the motor car during all variations of flexing of the load-supporting springs without cramping of the joints in said stabilizing means.

7. In a motor car, a sprung mass and an unsprung mass and intermediate springs, stabilizing means interconnecting said masses to minimize sidesway of the sprung mass during motion of the motor car when deflecting its course, said stabilizing means including a torsion-bar transverse of the motor car, journals supporting said torsion-bar on one of said masses, arms adjacent each end of said torsion-bar extending substantially horizontal when in normal position, a link connecting the end of each of said arms and the other mass, and having joint connections at the ends of each link including at least one universal joint, so constructed and arranged whereby relative movement of said masses provides for simultaneous oscillation of both arms to the same extent with the oscillation of the torsion-bar with the position of each link reacting to the force of oscillation at substantially right angles to each arm, assuring the functioning without cramping of the connections throughout the maximum movement between unsprung and sprung masses of the motor car when moving and deflecting its course.

8. In a vehicle having a sprung mass and an unsprung mass, springs interconnecting the same, stabilizing means interconnecting said two masses to minimize careening of the sprung mass when the vehicle is running at speed, said means comprising a cross-vehicle rigid torsion-member, journals at one of said masses, said torsion-member having at each end a rigidly connected arm extending generally at right angles of the torsion-member supplemented by and mounted with respect to said journals to be normally substantially horizontal, a link attached to the end of each of said arms and to the other mass, each link connected to be in normal position generally at right angles to each arm and generally vertical, the connection at the ends of each link including a ball-and-socket joint.

9. A stabilizing means for motor cars having a sprung mass and unsprung mass and intermediate suspension springs, comprising levers at opposite sides rigidly combined with a torsion-bar adapted to be positioned transverse of a motor car and to be connected at one of the masses of the motor car, the free end of each of said levers having a link adapted to be connected at the other mass of the motor car, each link having at one end a pivotal connection and at its other end a joint permitting oscillation on an axis transverse to the pivotal connection at the other end, so constructed and arranged whereby when installed in a motor car said stabilizing means will transmit free from cramping through the links, torsion-bar and its combined levers the relative displacement between the sprung and unsprung mass from each side of a motor car to the other side with substantially like amplitude.

10. In a vehicle, means for substantially equalizing the vertical displacement of the wheel on one side of the vehicle with respect to the wheel on the opposite side of the vehicle, comprising a transverse torque-rod journaled at the sprung mass, levers secured to move with said torque-rod and having their free ends linked by articulated joints, each to a part supporting a wheel and permitting movement of said part laterally of the vehicle without cramping the joints.

11. In a road vehicle, apparatus to minimize side rocking or careening of the sprung mass, two springs, one on each side thereof, between the sprung mass and the unsprung mass subject to vertical movement of the support on its side for an adjacent road wheel, a transverse torque-bar supported in journals fixed with relation to the sprung mass, a laterally projecting arm rigidly secured near each end of the torque-bar to oscillate vertically with the turning of the torque-bar, a link connecting the movable end of each arm in driving relation to the unsprung mass, and articulated joints for each end of each link, the joint at one end providing universal articulation.

12. In a motor car having a sprung mass and an unsprung mass with intermediate suspension springs, stabilizing means to minimize careening of the sprung mass when the motor car at speed is deflecting its course, comprising a cross-car torsion-bar rigidly connected with oscillatable arms at each end, a link at the oscillating end of each arm and a connection for said link at the unsprung mass formed by a joint adapted to articulate on two axes, whereby in functioning freedom of movement at their connection is provided without cramping, said arms and torsion-bar associated to function jointly by oscillation with respect to the sprung mass by a supporting bearing at the sprung mass on each side of the motor car.

13. A vehicle chassis having a frame, an axle extending transversely thereof and interconnecting suspension springs on opposite sides, a cross-car stabilizing construction including a bearing at the frame on each side, an arm supported to oscillate in each of said bearings, a cross-car torque-bar rigidly associated with both arms to maintain their oscillation in unison, a link having a pivotal joint at the oscillating end of each arm, and a joint at the other end of each link secured at the axle for oscillation relative thereto substantially about axes extending transverse of the axis of the axle.

14. A motor car with a frame and a sill on each side, a bearing means rigidly attached to each sill substantially in alignment on both sides of the vehicle on an axis parallel to the axle, an axle and suspension springs interposed between it and the frame, an arm on each side of the frame supported at said bearings to oscillate in a vertical plane, the relatively oscillating end of each arm having a pivotal joint connecting it to a link, a link extending from said pivotal joint to the axle means and having thereat a joint adapted to oscillate relatively in a plurality of axes, and a cross-car torsion-bar rigidly interconnecting said two arms.

15. In a motor vehicle, a frame having two side sill members, an axle means extending transversely thereof, suspension springs on opposite sides connecting each sill to the adjacent end of the axle means, a journal attached to each sill, a torsion-bar extending transversely of the frame supported by the said journals for rotary oscillation, a lever fixedly associated at each end of said bar each in proximity to one of said journals to oscillate with said torsion-bar, a link attached at the opposite end of each of said levers, a joint for attachment thereto permitting oscillation of the link with respect to the lever end, and a connection at the opposite end of each link to the axle means permitting articulation on a plurality of axes with respect to the axle means.

16. A vehicle chassis construction having in combination, a frame, an axle extending transversely of the frame, suspension springs on opposite sides of the frame connecting the latter to the axle, a torsion bar extending transversely of the frame and carried thereby, levers fixed to the torsion bar adjacent opposite ends thereof, attaching means carried by the axle adjacent opposite ends thereof, means establishing an operative connection between the free ends of the levers and axle including adjustable linkage having the upper ends connected to the free ends of the levers for oscillation relative to the latter substantially about an axis parallel to the axis of the torsion bar and having the lower ends connected to the attaching means for lateral oscillation relative to the axle.

17. A vehicle chassis construction having in combination a frame, an axle extending transversely of the frame, suspension springs on opposite sides of the frame connecting the latter to the axle, a torsion bar extending transversely of the frame and journaled upon the latter for rotation relative thereto, levers fixed to the torsion bar adjacent opposite ends thereof, attaching means carried by the axle adjacent opposite ends of the latter, means establishing an operative connection between the free ends of the levers and attaching means aforesaid including linkage having the upper ends connected to the levers for oscillation relative thereto and having the lower ends connected to the attaching means for oscillation relative to the axle, and means for adjusting the length of the linkage to compensate for variations in construction of the springs.

18. A vehicle chassis construction having in combination, a frame, an axle extending transversely of the frame, suspension springs on opposite sides of the frame connecting the latter to the axle, a torsion bar extending transversely of the frame and carried thereby, levers fixed to the torsion bar in spaced relation to each other axially of the bar, attaching means carried by the axle adjacent opposite ends of the latter, linkage connecting the free ends of the levers to the attaching means on said axle and means associated with the connection between each lever and axle for independently varying the effective lengths of said connections.

19. A vehicle chassis construction having in combination, a frame, an axle extending transversely of the frame, suspension springs on opposite sides of the frame connecting the latter to the axle, a torsion bar extending transversely of the frame and journaled upon the latter for rotation relative thereto, levers fixed to the torsion bar in spaced relation axially of the bar, means connecting the free ends of the levers to the axle including links having the upper ends secured to the free ends of the levers for pivotal movement about axes extending substantially parallel to the axis of the bar and having the lower ends secured to the axle for oscillation relative thereto substantially about axes extending transversely of the axis of the axle.

20. A vehicle chassis construction having in combination, a frame, an axle extending transversely of the frame, suspension springs on opposite sides of the frame connecting the latter to the axle, a torsion bar extending transversely of the frame and journaled upon the latter for rotation relative thereto, levers fixed to the torsion bar in spaced relation axially of the bar, means connecting the free ends of the levers to the axle including links having the upper ends secured to the free ends of the levers for pivotal movement about axes extending substantially parallel to the axis of the bar and having the lower ends secured to the axle for pivotal movement about axes extending transversely of the axis of the axle to permit vertical movement of one end of the axle relative to the other without straining said linkage, and means for independently varying the effective lengths of the links to compensate for variations in the suspension springs.

CHARLES B. HUNTMAN.